Dec. 4, 1923.  
G. C. HESTON  
HARROW  
Filed March 20, 1922  
1,476,512  
4 Sheets-Sheet 1

Inventor:  
George C. Heston,  
by Dodge and Sons,  
Attorneys.

Dec. 4, 1923.

G. C. HESTON

HARROW

Filed March 20, 1922  4 Sheets-Sheet 3

1,476,512

Inventor:
George C. Heston,
by Dodge and Sons,
Attorneys

Dec. 4, 1923.  1,476,512
G. C. HESTON
HARROW
Filed March 20, 1922    4 Sheets-Sheet 4
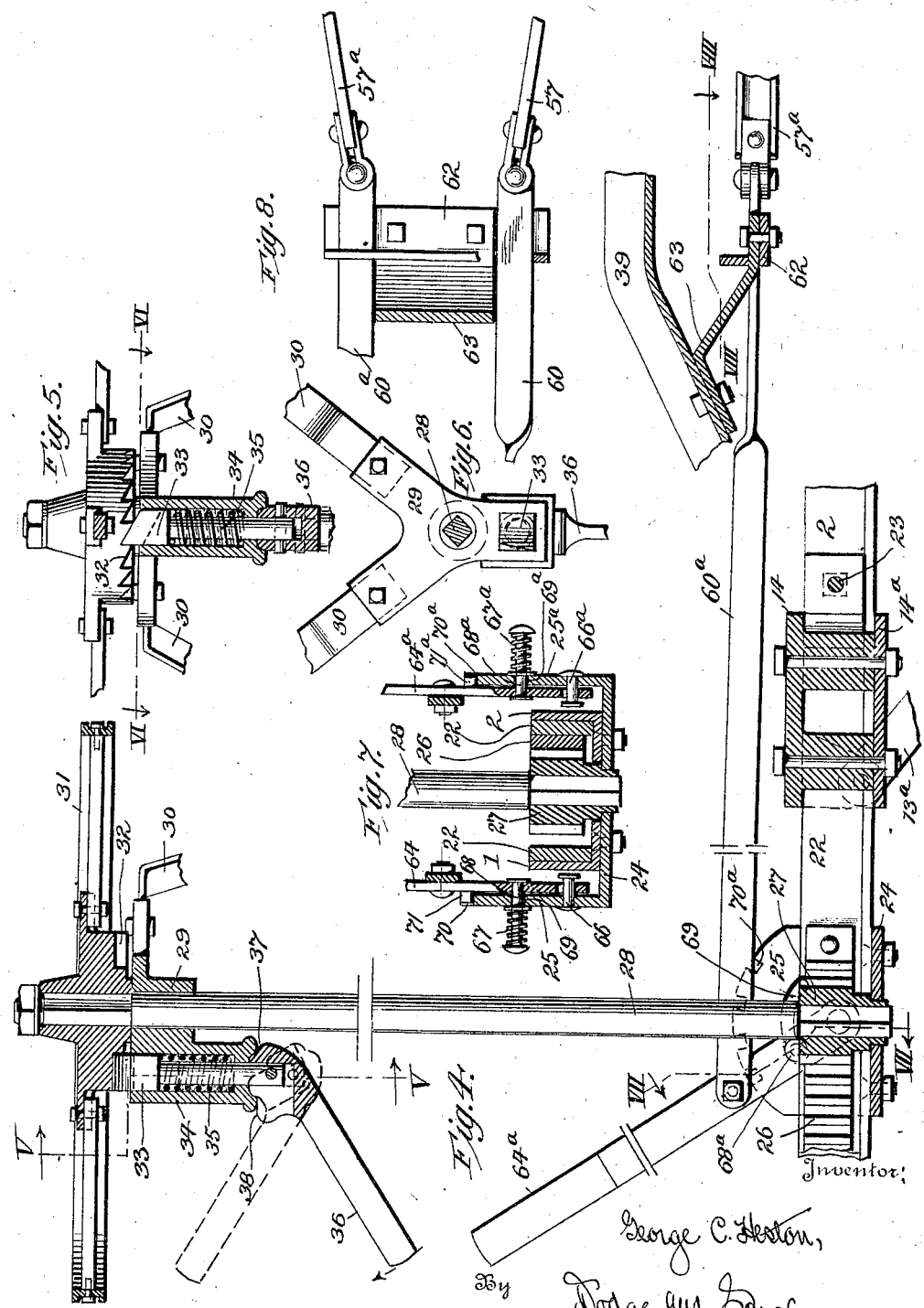

Patented Dec. 4, 1923.

1,476,512

UNITED STATES PATENT OFFICE.

GEORGE C. HESTON, OF MANSFIELD, OHIO, ASSIGNOR TO RODERICK LEAN MANUFACTURING COMPANY, OF MANSFIELD, OHIO, A CORPORATION OF NEW JERSEY.

HARROW.

Application filed March 20, 1922. Serial No. 545,196.

*To all whom it may concern:*

Be it known that I, GEORGE C. HESTON, a citizen of the United States, residing at Mansfield, in the county of Richland and State of Ohio, have invented certain new and useful Improvements in Harrows, of which the following is a specification.

This invention pertains to harrows and has to do more particularly with those of the tandem type wherein the front and rear gangs may be brought into different angular relations to each other and to the line of draft. Broadly considered, harrows of this general type have heretofore been employed but the present invention has for its main object a construction which admits of a wider range of adjustment as between the gangs and more particularly an independent variable adjustment of the rear gang units relative to each other as well as to the front gangs.

A further object of the invention resides in the provision of means extending to the forward portion of the structure, whereby the operator may set or determine the angle of the gangs, both forward and rear pairs, without leaving his seat upon the tractor employed to draw the harrow.

With these and other objects and advantages in view, as will hereinafter appear, reference will be had to the annexed drawings, wherein,—

Figure 1:
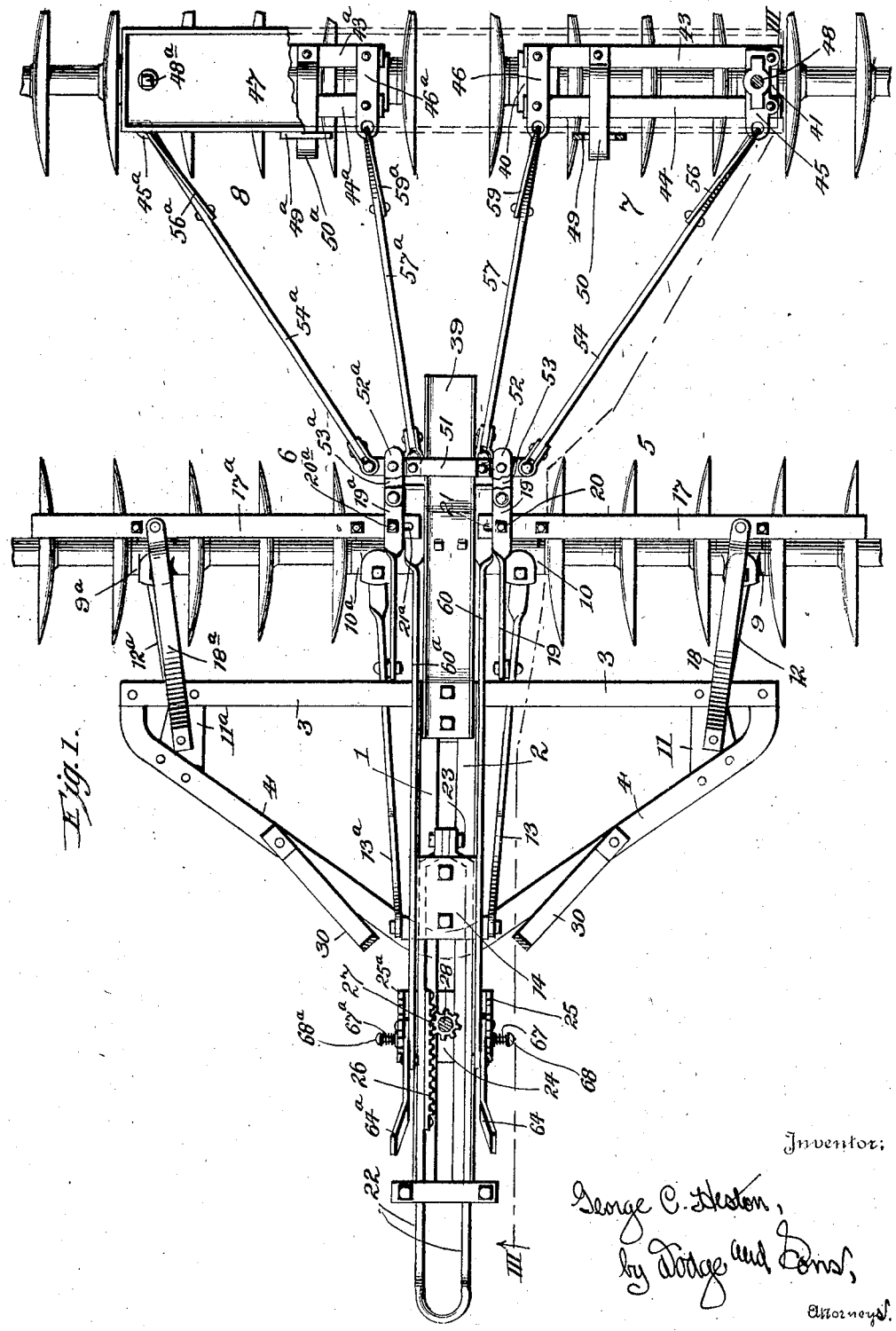
Figure 2:
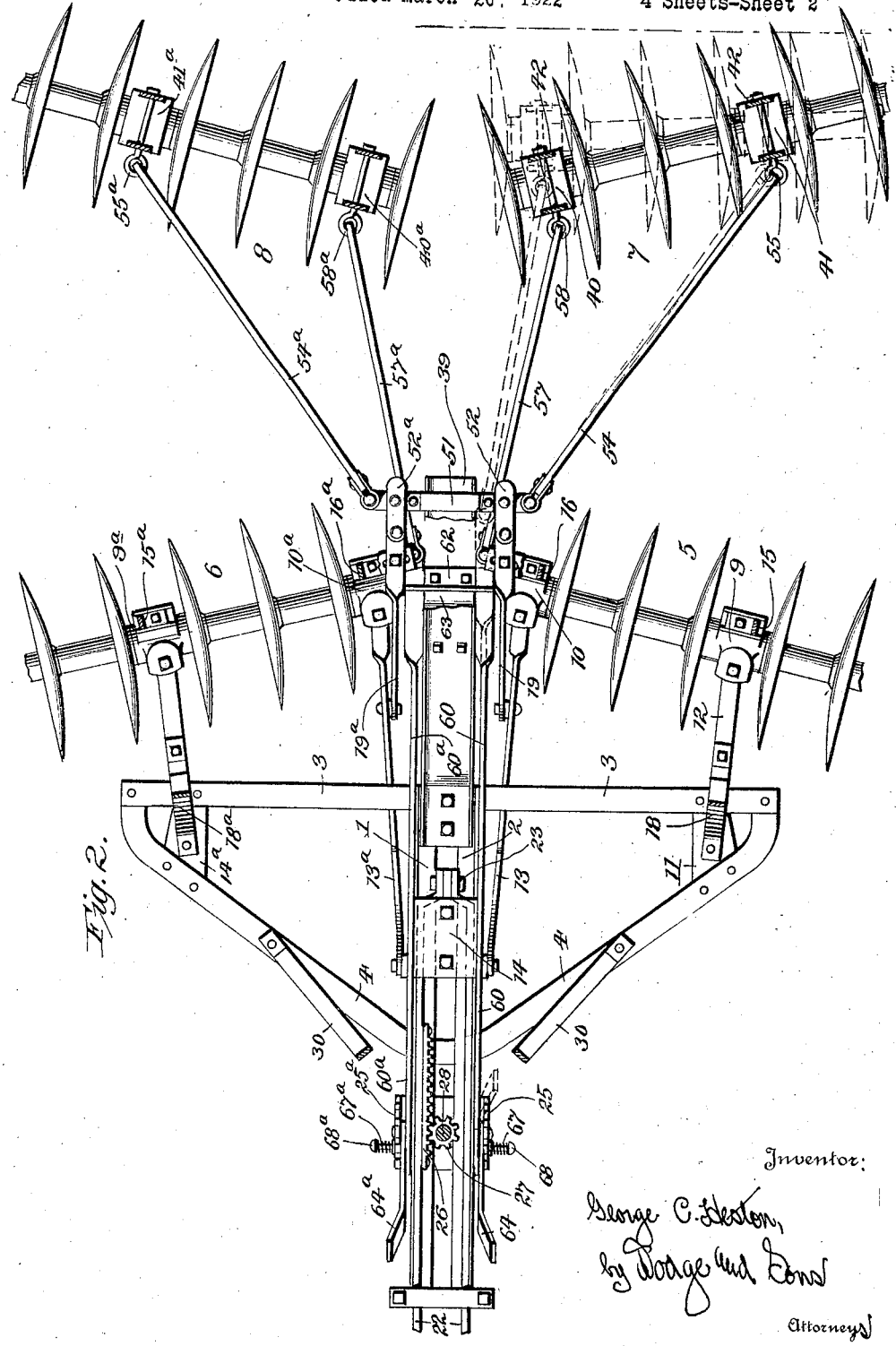

Fig. 1 is a top plan view of the harrow with the gangs is straightened parallel transporting position;

Fig. 2 a similar view with the gangs angled, and likewise showing, by dotted lines, a varying angular position in which one (or the other) of the rear gang units may be set or assume.

Figure 3:
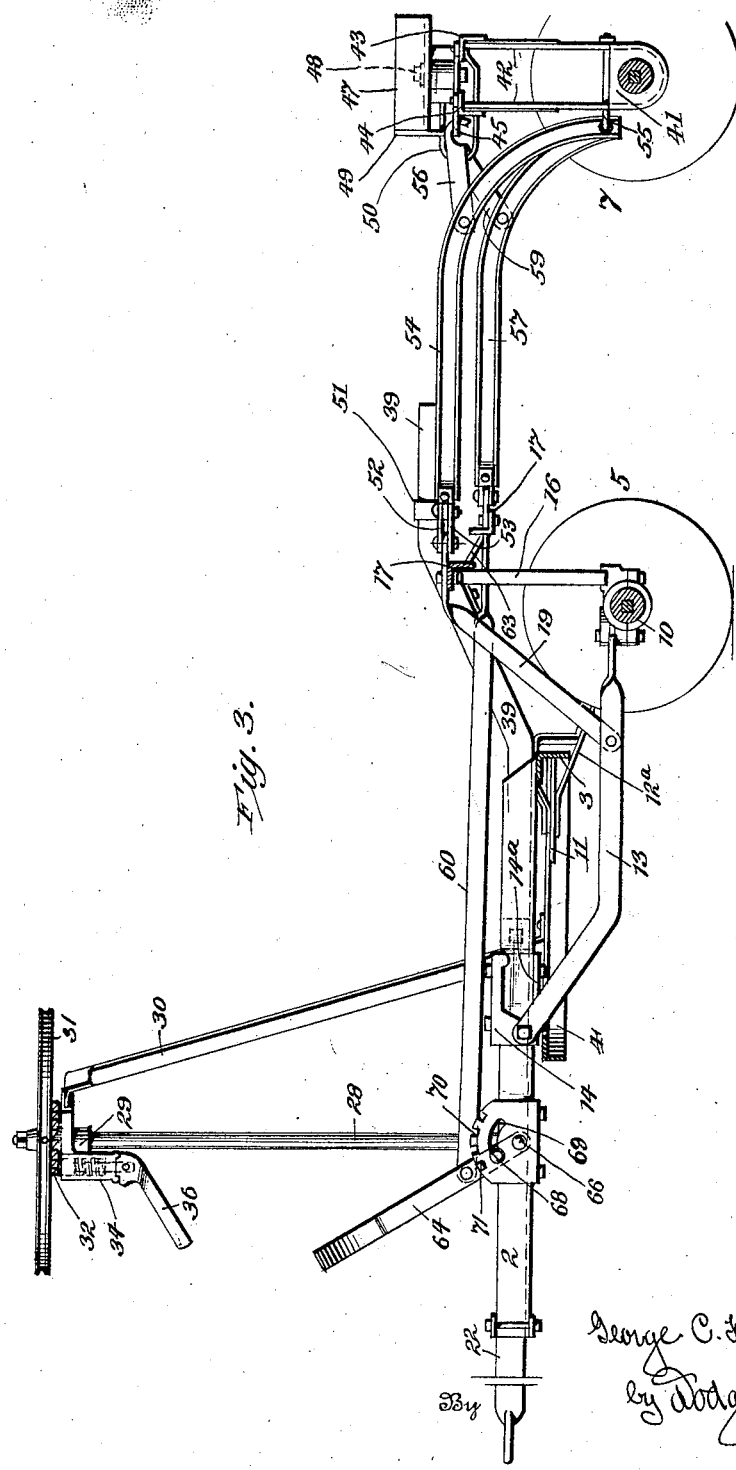

Fig. 3 a longitudinal vertical sectional view, taken on the line III of Fig. 1;

Fig. 4 a similar view on an enlarged scale, of the angle setting or determining mechanism;

Fig. 5 a detail view of the ratchet wheel and its allied parts;

Fig. 6 a horizontal section on the line VI—VI of Fig. 5;

Fig. 7 a transverse vertical sectional view on the line VII—VII of Fig. 4, illustrating the inter-connection between the clevis and the pinion carried by the manually operated adjusting shaft; also the lever and locking mechanism employed in conjunction with the positioning of the rear gangs; and Fig. 8 a horizontal detail sectional view taken on the line VIII—VIII of Fig. 4.

In said drawings, 1 and 2 denote angle bars forming the stub axle, which members are secured to a rigid front frame comprising a cross bar 3 and a forwardly curved member 4, said bars and member likewise being produced from angle forms. The front disk gangs are denoted by 5 and 6, respectively, the outer ends of the axles whereof are broken away, and the rear gangs are denoted by 7 and 8.

Inasmuch as the various supports connecting and positioning or controlling elements for each of the front gangs are duplicated, and the same holds true of the rear gangs as well, similar reference numerals will be applied throughout, with the exponent "a" to the duplicated members.

Each of the front gangs or gang units, is provided with two bearings or bearing boxes 9 and 10, the former being relatively fixed and affording the center about which the gang pivots to assume its angular or adjusted position. The fixed front frame at each end is provided with a gusset plate 11 and a radius bar 12 is pivoted thereto and to the bearing 9. A draw bar 13 is pivotally connected to the inner bearing 10, said bar extending forwardly and being secured to a draw block 14 slidably mounted on the stub axle, and adapted to be held in one or another adjusted position thereon, as will presently appear. Said block (see Fig. 4) extends downwardly through the stub axle and is held in position thereon by an underlying plate 14ª which is bolted thereto.

Extending upwardly from each of the respective bearings 9 and 10 are struts 15 and 16, (Figs. 2 and 3), which are in turn connected to an overlying angle bar 17 which lies parallel to the axle of the gang. A second radius bar 18 is pivotally connected to the gusset plate 11 by the same bolt as that which connects bar 12 thereto, the rear end of the bar 18 being pivotally connected to bar 17. A second draw bar 19 is pivotally connected at its lower forward end to the draw bar 13, said bar extending upwardly and over the bar 17 with which it has a sliding connection through a bolt 20 which passes freely through a slot 21 formed in the bar 17. Each of the front gangs is thus connected to the front frame by radius bar connections 12 and 18, and 12$^a$ and 18$^a$, respectively, and to the draw block 14 through the draw bars 13 and 13$^a$ and the bars 19 and 19$^a$. Slidably mounted upon the stub pole is a clevis 22, the clevis passing to each side of block 14 and having its rear end closed by a bolt 23. The clevis is designed to be moved along the pole and to be held in its adjusted position and to thereby determine the final position of the block, and consequently of the gangs when draft is applied to the clevis. To effect such adjustment various means may be employed, one of which is shown in drawings. Secured to the under face of the stub pole is a bearing plate 24, provided with upwardly extending bracket like extensions 25 and 25$^a$, see Figs. 4 and 7. A rack 26 is secured to the clevis 22 and meshing therewith is a pinion 27, the hub whereof finds a bearing in plate 24. Said pinion has a squared opening extending therethrough into which extends the lower squared end of a vertically disposed shaft 28. The upper end of the shaft passes though a bearing block or casting 29 held in place by suitable braces 30 which extend upwardly from the fixed or rigid forward frame. A hand wheel 31 is secured to the upper end of the shaft and the hub thereof, upon its under face, is provided with ratchet teeth 32 with which engages a locking bolt or dog 33. Said bolt is mounted within a chambered extension 34 of the bearing block 29 and is urged upwardly into locking position by a spring 35. A lever 36 is pivoted to the lower end or stem of the bolt, and is provided with two cam faces 37 and 38 adapted to coact with the lower outer face of the extension 34. In the full line position (Figs. 4 and 5) with the lever 36 thrown down, cam 37 allows the bolt to enter the teeth; when, however, the lever is drawn upwardly, cam 38 tends to draw the bolt downwardly and to hold it down so the cam 38 passes inwardly beneath the lower end of extension 34. When in the latter position the shaft may turn in either direction, and, as a consequence, the clevis may be pulled forward with reference to the stub pole or moved rearwardly. With the parts in the full line position, the clevis may be pushed rearwardly, or the wheel 31 turned clockwise, and the clevis forced backwardly through the rack and pinion construction. Forward movement of the clevis is, however, prevented, with the parts in such position. Adjustment of the clevis determines the ultimate position of the draw block 14 and, consequently, determines the angularity of the gangs when draft is applied, as will be hereinafter more fully set forth.

Secured to the rear end of the stub pole and to the cross member 3 of the forward frame, is a member 39, preferably formed of channel iron. Said member extends upwardly and rearwardly from the frame and its rearmost portion lies in a horizontal plane. The parts which cooperate with the rear gangs 7 and 8 to position them and hold them in their adjusted position, are duplicated with reference to each gang, and such parts will be denoted by similar reference numerals with the exponent "a" applied to the second or duplicate set. The rear gang 7 is provided with two bearings 40 and 41, from which extends upwardly suitable frame members 42, which, in turn, are connected by horizontal members 43 and 44, straps 45 and 46 being, in turn, secured to the elements 43 and 44. These members, in effect, form a framework, and overlying the frames thus produced is a connecting frame or weight box 47, the connection being effected between said box and the underlying frame through vertically disposed pivot bolts 48, 48$^a$. The frame 47 thus holds the rear gangs 7 and 8 in spaced relation while permitting the gangs to be angled independently of each other or simultaneously, as may be desired. Secured to the frame or weight box 47 are downwardly extending plates 49, 49$^a$, said plates having an eye formed in the lower end thereof and cooperating with straps 50 which are secured to the underframe and passing through the eye formed in the plate. This serves to limit the swinging movement of the gangs with reference to the connecting frame 47. Overlying and resting upon the rearward extension of the member 39 is a cross bar 51, the outer ends of which are depressed and stand in alinement with the rear ends of the draw bars 19 and 19$^a$, to which the ends of said bar are connected by the links 52, 53 and 52$^a$ and 53$^a$, respectively. Pivotally connected to the outer end of the bar 51 is a draft rod 54, said bar extending rearwardly and downwardly and being connected at its lower end to an eye-bolt 55 which extends through the frame members 42 (see Fig. 2) directly above the box bearing 41. Said draft bar 54 is connected to the upper portion of the under frame by a link 56, the rear hooked end of which takes into an eye formed in the member 45. A draft bar 57, similar in form to the draft bar 54, is pivotally connected at its lower rear end to an eye-bolt 58 secured to the frame members above the bearing 40, and likewise connected at its upper end through a hook link 59 to the rear frame, or, more specifically, the member 46 thereof. At its forward end the draft bar 57 is pivotally attached to a draw bar or link 60, which draw bar extends forwardly at a point slightly above that of the stub pole and the clevis. At its rear portion it passes through an opening formed in the upstanding member of an angle plate 62, which is secured to a bracket 63 which in turn is attached to the under face of the rearwardly extending frame member 39. The angle member 62, as will be best seen upon reference to Fig. 8, is of a length greater than the width of the bracket 63, and the draw bars 60 and 60ª pass through the opening formed in the upstanding member of the angle plate 62 to each side of the bracket member 63, and in a sense are guided thereby. At its forward end the draft bar 60 is pivotally connected to a hand lever 64, which, in turn, is pivotally attached at its lower end to the upstanding arm 25 of the bracket member 24, secured to the stub pole. The pivotal connection of the lower end of the lever 64 is effected through a bolt 66 which passes through an enlarged opening formed in the lower end of the lever so that the lever may be swung inwardly away from the bracket element 25 to which it is normally drawn by a spring 67 which encircles a pin 68 secured to and movable with the lever. Said pin, as will be seen upon reference to Figs. 3 and 4, passes through an arcuate slot 69 formed in the bracket member 25, the upper edge of which bracket member is curved and provided with a series of recesses 70, adapted to receive a fixed lug 71 extending laterally from the lever in line with said notches or recesses.

To change the position of the lever, the operator throws the inner end inwardly and then shifts it backward or forward, as may be desired, and when it comes opposite the desired notch, dependent upon the adjustment of the parts to be effected, the lever will become locked upon release thereof by the operator, the spring 67 serving to draw it toward the bracket member 25 and causing the pin or lug 71 to enter the notch which is then opposite it.

It will be noted upon reference more particularly to Figs. 1 and 2 that the draw bars or links 60 and 60ª and their lever mechanisms are independent of each other and that the draw bars, and consequently the position of the draft bars 57 and 57ª, may be adjusted independently of each other. It therefore follows that the angular adjusted position of the rear gangs with reference to each other and to the front gangs, may be varied as desired.

Having reference to Fig. 2, and considering the full line position, it will be seen that the inner ends of each of the rear gangs 7 and 8 are drawn forward to the full extent. Considering the dotted line position, in which instance the lever or handle 64 is thrown rearwardly, it will be seen that the gang 7 is moved substantially back to a position where it approaches a line at right angles to the line of draft. It will also be observed that both of the handles 64 and 64ª, are at the forward end of the machine where they can be reached, as can also the handle 36 and the wheel 31, by the operator while he is occupying his seat upon the tractor, and that, therefore, the parts may be brought to any desired position without the necessity of the operator leaving his seat.

When it is desired to fully straighten the gangs to bring them into the transporting position, the handles 64 and 64ª will be thrown fully forward and locked in that position, the handle 36 being thrown to the dotted line position (Fig. 4) at the same time, so as to withdraw the locking pawl and allow the wheel 31, the shaft 28, and the allied parts, to run free, whereupon draft upon the clevis will pull both sets of gangs to the straight position. When the gangs are straight the clevis is fully forward and the cross bar 51 is likewise fully forward, as indicated in Fig. 1.

As above pointed out, the rear gangs may be adjusted to different angles independent of each other and to any angle, intermediate straight and fully angled position, and this may be done while the harrow is in motion. It is frequently advantageous, when working in light soil, to have the rear gangs at less angle than the front gangs, as with such less angularity the rear gangs will throw less earth than the front gangs. A further advantage resides in the fact that one rear gang can be given less angle than the other, which is of great utility in hill side work.

As will be understood by those skilled in the art the degree of angularity of the front gangs and also the rear gangs, may be determined by the operator through the manipulation of the hand wheel 31 which varies the adjustment of the clevis with reference to the draft block 14.

Assuming that the parts are in the position in Fig. 1, or what is known as the transporting position, with all the disks in line with the draft, the operator will, through the manipulation of the wheel 31, move the clevis rearwardly from the position shown in Fig. 1 to that which it occupies in Fig. 2, and the clevis will be automatically locked in such position through the bolt 33, preventing retrograde movement of the wheel and its allied parts. Upon application of draft to the clevis, the disks digging into the earth, will draw the gangs to the position shown in full lines in Fig. 2, the block 14 moving rearwardly until it abuts the closed end of the clevis, the front gangs pivoting about the bars 15 and 15ª and the rear gangs pivoting about the inner bearings 40 and 40ª. Any position, intermediate straight and fully angled, may be effected by varying the adjustment of the clevis with reference to the stub pole, and allowing it to become locked in such position. This action is, of course, as above noted, independent of the variable angular adjustment which may be effected in either one or both of the rear gangs through the manipulation of the levers 64 and 64ª.

It will also be understood that the parts may be set for angling by the backing of the tractor, which has the effect of pushing the clevis back and positioning the same so that when draft is applied the gangs or gang units will be brought to the desired angular relation. Such rearward movement of the clevis is permitted by the ratchet teeth 32 and the beveled locking bolt 33, the construction, however, automatically locking and preventing forward movement of the clevis with reference to the stub pole and front frame under the application of draft.

What is claimed is,—

1. In a tandem disk harrow, a pair of front gangs; a pair of rear gangs; means acting under draft applied to the harrow for placing the gangs in angle; and means, under the control of the operator, for independently varying the angularity of either or both of said rear gangs with relation to the front gangs and to each other.

2. In a tandem disk harrow, a pair of front gangs; a pair of rear gangs; means acting under draft to place the gangs in angle; and means under the control of the operator for varying the angular position of one of the rear gangs independently of the other.

3. In a tandem disk harrow, a pair of front gangs; a pair of rear gangs; means for placing the gangs in angle; and means under the control of the operator for varying the angle of either or both of the rear gangs independently of change in position of the front gangs.

4. In a tandem disk harrow; a pair of front gangs; a pair of rear gangs; means for simultaneously placing the gangs in angle by draft applied to the harrow; and means located at the forward portion of the harrow and under control of the operator for varying the angularity of either one or both of the rear gangs.

5. In a tandem disk harrow, a pair of front gangs; a pair of rear gangs; adjustable means for determining the angular position the gangs will assume under draft applied to the harrow; and manually operated means capable of being actuated when the harrow is in motion for varying the angular position of either or both of the rear gangs.

6. In a tandem disk harrow, the combination of a front frame; a pair of gangs pivotally connected thereto for assuming angular position with reference to the line of draft; a rear frame; a pair of rear gangs pivoted thereto; means carried by the front frame for determining the angular position the gangs may assume under draft; draft connections extending from the gangs to said means; and means under the direct control of the operator for effecting an independent angular positioning of either or both of the rear gangs.

7. In a tandem disk harrow, the combination of a pair of front gangs pivotally mounted for angular positioning with reference to the line of draft; a pair of rear gangs similarly mounted; draft actuated means for placing both sets in angle; and means under the control of the operator for varying the angular position of either or both of said rear gangs, said means being susceptible of being operated prior to the application of draft or during the same.

8. In a tandem disk harrow, the combination of a front frame embodying a stub-axle; a draft clevis mounted for adjustment thereon; a draft block slidably mounted on the pole; means for locking the clevis in its adjusted position and against forward movement; a pair of front gangs; connections between each gang and the frame permitting said gangs to swing into angular relation to the line of draft; a pair of pivoted rear gangs; a draft block mounted on the stub pole and adapted to be arrested upon rearward movement by the clevis; draft connections extending from the block to the front and rear gangs; and means under the control of the operator for varying the degree of angularity of each or both of said rear gangs, as desired.

9. In a harrow, front and rear frames; disk gangs carried thereby; means for automatically straightening said rear gangs in backing; means for setting an angle for the rear gangs in backing and for assuming the angle so set on the next forward pull; and means under the control of the operator for permitting variation of the angular adjustment of at least one of said rear gangs with reference to the other.

10. In a harrow, front and rear harrow units; disk gangs on said units; means connecting said units; means operable by the draft power for setting the angle in both sets of gangs in backing; means for putting the gangs into angle by a pull; and means under the control of the operator for permitting variation of the angular adjustment of at least one of said rear gangs with reference to the other.

11. In a harrow, the combination of a front frame; a stub pole secured thereto; a draft clevis mounted for adjustment upon the pole; a draft block slidably mounted with reference to the pole and adapted to be arrested in its movement by the clevis; a pair of front gangs; a pair of rear gangs; draft connections between the draft block and the front and rear gangs; a pivotal connection between each of the front gangs and the front frame; pivotal connections for the rear gangs; and means under the control of the operator for moving said last named connections toward and from the front frame whereby the angular adjustment of the rear gangs may be varied as desired.

12. In a disk harrow, the combination of a front frame; a stub pole extending forwardly therefrom; a draft clevis slidably mounted upon said stub pole; means for locking said clevis in its adjusted position with relation to the pole; a rearwardly extending member secured to the front frame; a draft block cooperating with the clevis; a pair of front gangs; a pivotal connection between each of the front gangs and the front frame; a pair of rear gangs; draft connections extending from the draft block to the front and rear gangs; a bearing located adjacent the inner end of each of the rear gangs; a bracket shaped member secured to the under face of the rear extension of the frame; a pair of draw bars passing through said bracket member and extending forwardly adjacent the stub pole; connections between the rear ends of said draw bars and the bearings at the inner ends of the rear gangs; and means, under the control of the operator for moving said draw bars forwardly and rearwardly and holding them in their adjusted position whereby the angular position of said rear gangs may be varied independently of the other parts of the mechanism, and independently of the angular adjustment imparted to the front gangs.

13. In a disk harrow, the combination of a front frame; a stub pole extending forwardly therefrom; a draft clevis slidably mounted upon said stub pole; means for locking said clevis in its adjusted position with relation to the pole; a rearwardly extending member secured to the front frame; a draft block cooperating with the clevis; a pair of front gangs; a pivotal connection between each of the front gangs and the front frame; a pair of rear gangs; draft connections extending from the draft block to the front and rear gangs; a bearing located adjacent the inner end of each of the rear gangs; a bracket shaped member secured to the under face of the rear extension of the frame; a pair of draw bars passing through said bracket member and extending forwardly adjacent the stub pole; connections between the rear ends of said draw bars and the bearings at the inner ends of the rear gangs; a pair of levers fulcrumed upon a fixed portion of the structure and pivotally connected to the forward ends of the draw bars, respectively; and means for locking said levers in their adjusted position.

14. In a disk harrow, the combination of a front frame; a stub pole extending forwardly therefrom; a draft clevis slidably mounted upon said stub pole; means for locking said clevis in its adjusted position with relation to the pole; a rearwardly extending member secured to the front frame; a draft block cooperating with the clevis; a pair of front gangs; a pivotal connection between each of the front gangs and the front frame; a pair of rear gangs; draft connections extending from the draft block to the front and rear gangs; a bearing located adjacent the inner end of each of the rear gangs; a bracket shaped member secured to the under face of the rear extension of the frame; a pair of draw bars passing through said bracket member and extending forwardly adjacent the stub pole; connections between the rear ends of said draw bars and the bearings at the inner end of the rear gangs; a bracket shaped member secured to the under face of the stub pole at the forward portion thereof, said bracket member being provided with two upstanding elements, the upper edge of each of which is provided with a series of notches; a lever loosely fulcrumed upon each of said brackets; a pin extending outwardly from each lever in line with the notches formed in the upper face of the bracket member; and a spring serving to hold the lever toward said bracket member and to cause the pin to enter one or the other of the notches in said bracket member.

15. In a disk harrow, the combination of a rigid front frame; a stub pole extending forwardly therefrom; a pair of gang units located in rear of the front frame; a pivotal connection between said front frame and each of said units; a draft block slidably mounted upon the stub pole; draft connections between said block and the disk units; a draft clevis mounted upon the stub pole for longitudinal adjustment with reference thereto; a rack secured to the clevis; a vertically disposed shaft; a pinion carried thereby and meshing with the rack; a hand wheel secured to the upper end of the shaft; a ratchet wheel associated with the hand wheel; a locking bolt normally held in engagement with said ratchet wheel; a lever handle pivotally attached to the lower end of the locking bolt; and two cams formed upon the hand lever, said cams coacting with a fixed portion of the bolt housing whereby the bolt will upon movement of the lever be drawn downwardly and held in its retracted position so that the shaft and its allied parts may run free.

In testimony whereof I have signed my name to this specification.

GEORGE C. HESTON.